United States Patent
Leung et al.

(10) Patent No.: US 8,179,455 B2
(45) Date of Patent: May 15, 2012

(54) OPTICAL BLACK-LEVEL CANCELLATION FOR OPTICAL SENSORS USING OPEN-LOOP SAMPLE CALIBRATION AMPLIFIER

(75) Inventors: Lap Chi (David) Leung, Hong Kong (HK); Yat Tung Lai, Hong Kong (HK); Chun Fai Wong, Hong Kong (HK); Kam Hung Chan, Hong Kong (HK); Kwok Kuen (David) Kwong, Davis, CA (US)

(73) Assignee: Hong Kong Applied Science and Technology Research Institute Co., Ltd., Hong Kong (HK)

( * ) Notice: Subject to any disclaimer, the term of this patent is extended or adjusted under 35 U.S.C. 154(b) by 267 days.

(21) Appl. No.: 12/722,148

(22) Filed: Mar. 11, 2010

(65) Prior Publication Data

US 2011/0221938 A1 Sep. 15, 2011

(51) Int. Cl.
*H04N 5/217* (2011.01)
(52) U.S. Cl. ......... 348/241; 348/243; 348/250; 348/251
(58) Field of Classification Search .......... 348/241–257, 348/294–308; 341/118–122, 139, 143, 155
See application file for complete search history.

(56) References Cited

U.S. PATENT DOCUMENTS

| | | | | |
|---|---|---|---|---|
| 5,757,440 A * | 5/1998 | Mangelsdorf | | 340/573.4 |
| 5,844,431 A * | 12/1998 | Chen | | 327/94 |
| 6,005,615 A | 12/1999 | Tsuda | | |
| 6,499,663 B1 * | 12/2002 | Yahagi et al. | | 235/462.28 |
| 6,529,237 B1 * | 3/2003 | Tsay et al. | | 348/241 |
| 6,587,144 B1 * | 7/2003 | Kim | | 348/241 |
| 6,617,567 B2 * | 9/2003 | Mukherjee et al. | | 250/214 A |
| 6,750,910 B1 | 6/2004 | Bilhan | | |
| 6,753,913 B1 * | 6/2004 | Bilhan et al. | | 348/241 |
| 6,829,007 B1 | 12/2004 | Bilhan et al. | | |
| 6,940,548 B2 * | 9/2005 | Ying et al. | | 348/241 |
| 6,965,332 B2 | 11/2005 | Nakamura et al. | | |
| 7,278,577 B2 * | 10/2007 | Yahagi et al. | | 235/462.28 |
| 7,714,913 B2 * | 5/2010 | Sase et al. | | 348/243 |
| 7,750,955 B2 * | 7/2010 | Shirai et al. | | 348/243 |
| 8,106,987 B1 * | 1/2012 | Vu et al. | | 348/311 |
| 2001/0008420 A1 * | 7/2001 | Opris | | 348/223 |
| 2002/0033891 A1 * | 3/2002 | Ying et al. | | 348/241 |
| 2002/0047934 A1 * | 4/2002 | Nitta et al. | | 348/689 |
| 2004/0196392 A1 * | 10/2004 | Yahagi et al. | | 348/241 |
| 2004/0222351 A1 * | 11/2004 | Rossi | | 250/208.1 |
| 2009/0309033 A1 * | 12/2009 | Cho | | 250/370.08 |

* cited by examiner

*Primary Examiner* — Sinh Tran
*Assistant Examiner* — Selam Gebriel
(74) *Attorney, Agent, or Firm* — Stuart T. Auvinen; g Patent LLC

(57) ABSTRACT

A Optical Black Pixel (OBP) cancellation circuit corrects offsets in sensors in a CCD/CMOS image sensor when reading dark pixels such at the periphery. A pixel voltage is switched to a sampling capacitor during two phases of the same pixel pulse. Sampling capacitors and feedback capacitors connect to differential inputs of an amplifier. An accumulating capacitor accumulates voltage differences and generates a common-mode voltage that is fed back to another sampling capacitor that stores an amplifier offset. The sampling capacitor and accumulating capacitor and their associated switches form a discrete-time first-order low-pass filter that filters the pixel voltage during the first phase. In the second phase the amplifier acts as a unity-gain amplifier to output an average of the pixel voltage differences generated during an OBP time when blackened or covered pixels are read from the image sensor.

20 Claims, 11 Drawing Sheets

PHASE 2

PHASE 1

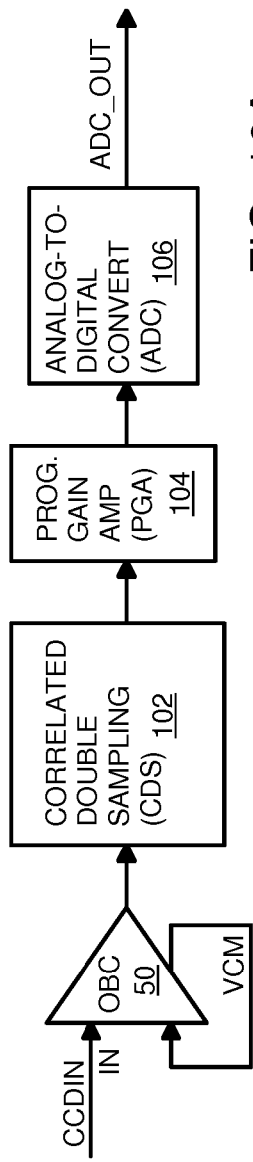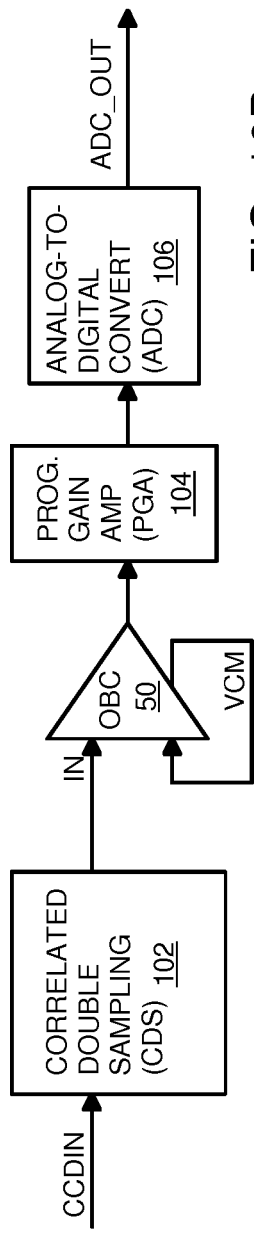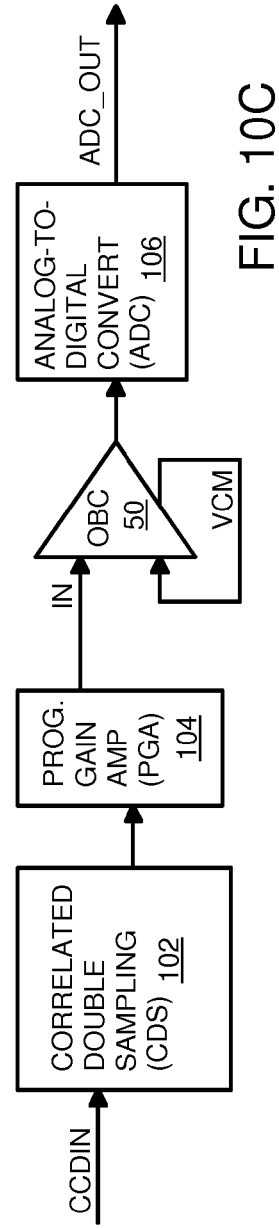

OPTICAL BLACK-LEVEL CANCELLATION FOR OPTICAL SENSORS USING OPEN-LOOP SAMPLE CALIBRATION AMPLIFIER

FIELD OF THE INVENTION

This invention relates to graphics input circuits, and more particularly to Optical Black Pixel (OBP) Cancellation circuits.

BACKGROUND OF THE INVENTION

Digital cameras and other visual input devices use light sensors such as Charge Coupled Devices (CCD) and complementary metal-oxide-semiconductor (CMOS) sensors. These CCD/CMOS light sensors have an array of pixel sensors that an optical image is focused upon. Each pixel sensor may include sub-pixel sensors that sense a different frequency or color of light, such as a Red, Green, and Blue sub-pixel sensor. Alternately, a red and a blue chromatic sensor may be used with a luminosity sensor for YUV pixel coding, or a monochromatic pixel sensor may be used.

FIG. 1 shows a CCD/CMOS light sensor. CCD/CMOS sensor 10 has an array of rows and columns of pixel sensors 12, 14. A lens may be used to focus an image onto the surface of CCD/CMOS sensor 10. However, the periphery of the image may be distorted by the lens or may be blocked by frames or other structures in the camera, or the image may be cropped by the camera to fit a desired size, such as 640×480 pixels, or some other standard size. A frame within the camera may block light to some pixel sensors, such as dark pixel sensors 14, while allowing light from the lens to reach illuminated pixel sensors 12. Both illuminated pixel sensors 12 and dark pixel sensors 14 are identical pixel sensors in the array of CCD/CMOS sensor 10, but the structure of the digital camera casts a shadow onto dark pixel sensors 14 while focusing the image onto illuminated pixel sensors 12. There may also be rows of dark pixel sensors 14 at the top and bottom, but these are not shown.

External clocks SHP, SHD are applied to CCD/CMOS sensor 10 as shift clocks to sample different ones of illuminated pixel sensors 12 and dark pixel sensors 14. As SHP, SHD are pulsed, a next one from illuminated pixel sensors 12 is shifted to the CCDIN output of CCD/CMOS sensor 10. Another clock such as a BLK signal (not shown) can be pulsed as the current pixel moves from one horizontal line to the next line, and a frame signal (not shown) can be pulsed to move to the first pixel on the first line to start sampling of a new frame. A variety of control signals may be substituted by the manufacturer of CCD/CMOS sensor 10.

FIG. 2 is a waveform diagram of operation of the CCD/CMOS sensor. When a new line of pixel sensors in CCD/CMOS sensor 10 is read, the first few pixels read are from dark pixel sensors 14. Then a large number of illuminated pixels are read from illuminated pixel sensors 12, followed by a few dark pixels from dark pixel sensors 14 at the end of the line. Sensing of the beginning of the line is shown in FIG. 2.

Shift pixel clocks SHP, SHD are alternately pulsed low. Non-overlapping clocks CLK1, CLK2 are generated from SHP, SHD. CCD/CMOS sensor 10 outputs a fixed voltage in response to SHP, and then the actual pixel value as a variable voltage in response to SHD. The larger negative voltage output by CCD/CMOS sensor 10 on CCDIN represents a brighter pixel for the color being sensed. Each pixel location on CCD/CMOS sensor 10 can have 3 pixel values successively output on CCDIN, such as for Y, U, and V components of one pixel location.

When dark pixel values are being output by CCD/CMOS sensor 10, Optical Black Pixel (OBP) signal OPB is driven active (low). The OBP signal can be generated by a logic circuit or state machine that also generates SHP, SHD and other control signals. The digital camera designer determines which pixels on CCD/CMOS sensor 10 are shaded by the camera and which pixels the lens is focused on. Further cropping of the image may be performed by the digital camera or by other devices.

Ideally, dark pixel sensors 14 would output a constant, fixed voltage such as zero volts. However, small random offsets in dark pixel sensors 14 and in other circuitry exist, even when no light is reaching dark pixel sensors 14. These offsets are amplified by analog front end (AFE) circuitry at the output of CCD/CMOS sensor 10 and may saturate the output device if the offset is not cancelled correctly.

FIG. 2 shows that the lowest level of CCDIN during the low-going pulses when OBP is active vary somewhat for the 4 black pixels being output. Once OBP is inactive (high), illuminated pixels output much larger low-going pulses on CCDIN. However, pixels within the illuminated region that are darkened, such as for a black portion of the image, may not be accurately represented. Their voltage may be greater or lesser than the voltages of the black pixels from dark pixel sensors 14 during OBP. For example, the last pixel in FIG. 2 has a voltage that is somewhat more negative than some of the four black pixels at the beginning of FIG. 2.

The relative darkness of black pixels in the displayable region of the image may be affected by the offsets and cause visible distortions on the display device, such as on a flat-panel television. Even when CCD/CMOS sensor 10 is covered and receives no light, small offsets within illuminated pixel sensors 12 may create variations in the pixel voltage output, and ultimately on the display device. Saturation may also occur. Thus the black level needs to be controlled in CCD/CMOS sensor 10 since any offsets of dark pixels may be amplified by downstream logic after CCDIN.

The black-level offsets may be corrected either in analog or in digital domains using a feedback method. A large off-chip capacitor is required for filtering and stability concerns, but it increases both the cost and the size and thus is undesirable. The comparison between the target and actual dark level may be done after a Programmable-Gain Amplifier (PGA) that is downstream of CCDIN. The error is fed back to the input of the PGA, and creates a feedback loop that is sensitive to noise when the PGA gain is high. The comparison may also be performed after an Analog-to-Digital Converter (ADC) in the digital domain, after the PGA, but the large off-chip capacitor is still required, and the noise sensitivities are still present when the PGA gain is large at low-illumination conditions. The comparison and filtering can also be done after the ADC in the digital domain, but the PGA and ADC may become saturated easily as the PGA output swings and the ADC input range needs to be enlarged to accommodate the extra signal due to the dark level offset. The enlarged PGA and ADC ranges are expensive and may not be feasible when the supply voltage is limited.

What is desired is an Optical Black Pixel (OBP) cancellation circuit that does not need a large off-chip capacitor. An OBP cancellation circuit is desired that does not need an extended ADC range or extra output swing on the PGA to prevent saturation at low-illumination levels. An OBP cancellation circuit with a fast response time and stability that can be placed at various locations, such as before or after the PGA is desirable.

BRIEF DESCRIPTION OF THE DRAWINGS

FIGS. 10A-C show three locations of the OBP cancellation circuit in a digital image-capture device.

DETAILED DESCRIPTION

The present invention relates to an improvement in Optical Black Pixel (OBP) cancellation circuits for digital image-capture devices. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the black levels of dark pixel sensors can be sensed and filtered to generate an average black-pixel voltage during the time that the Optical Black Pixel (OBP) signal is active at the periphery of the CCD/CMOS sensor. The average black-pixel voltage can be generated from a reference or common-mode voltage by a sample and hold amplifier and then applied to a differential amplifier to be subtracted from illuminated pixel values.

Figure 1:
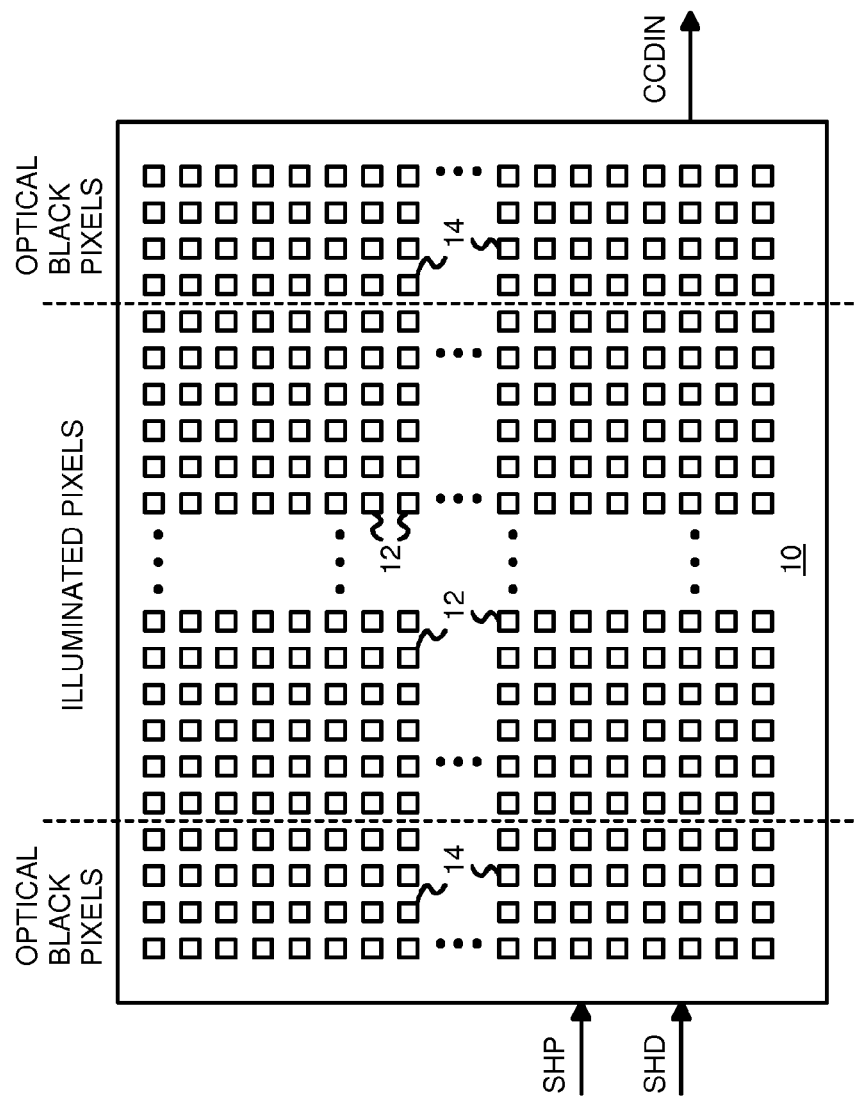
FIG. 1 shows a CCD/CMOS light sensor.
Figure 3:
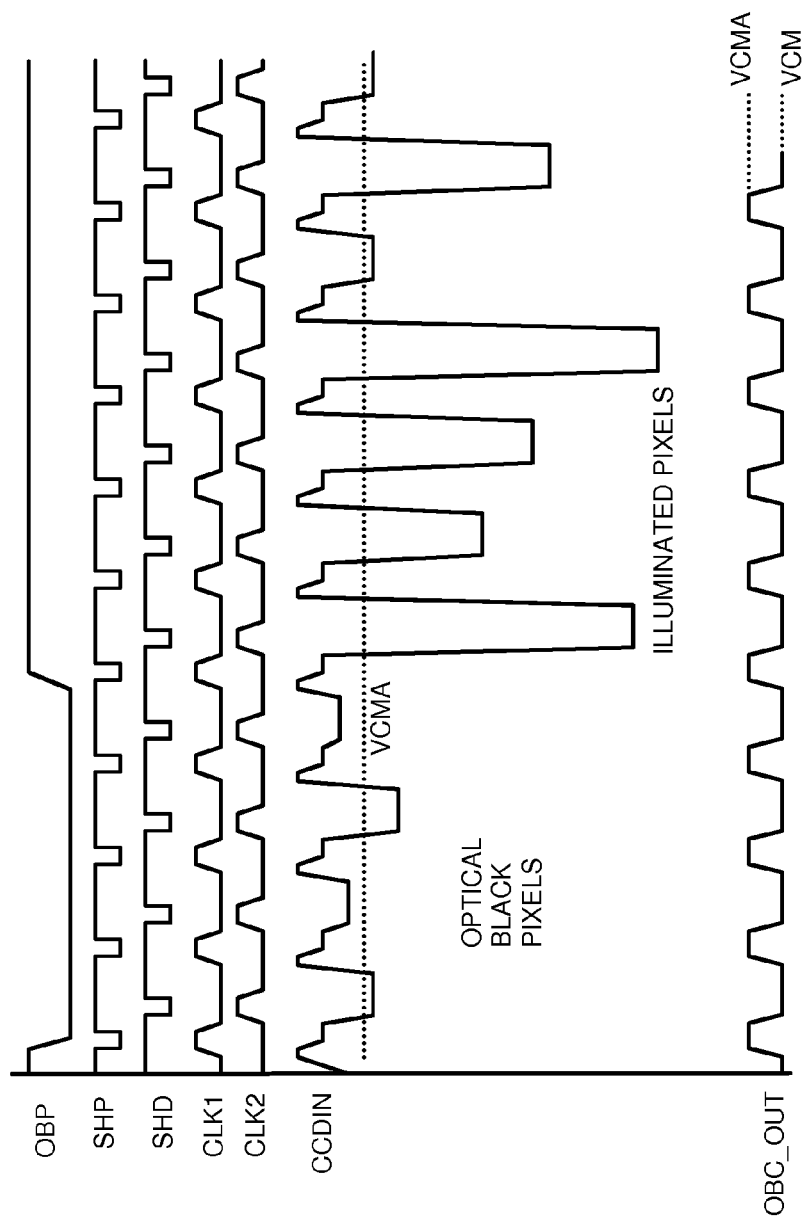
FIG. 3 is a waveform diagram of generating an average of dark-pixel voltages when OBP is active.

FIG. 3 is a waveform diagram of generating an average common-mode voltage (VCMA) from an average of dark-pixel voltages when OBP is active. When a new line of pixel sensors in CCD/CMOS sensor 10 (FIG. 1) is read, the first few pixels read are from dark pixel sensors 14. Then a large number of illuminated pixels are read from illuminated pixel sensors 12, followed by a few dark pixels from dark pixel sensors 14 at the end of the line. Sensing of the beginning of the line is shown in FIG. 3.

Shift pixel clocks SHP, SHD are alternately pulsed low and non-overlapping clocks CLK1, CLK2 are generated. CCD/CMOS sensor 10 outputs a fixed high voltage in response to SHP, and then the actual pixel value as a variable low voltage in response to SHD. Larger negative voltages on CCDIN represent brighter pixels. When dark pixel values are being output by CCD/CMOS sensor 10, Optical Black Pixel (OBP) signal OPB is driven active (low).

When OBP is active (low), the average of the low-going voltages on CCDIN, (the dark-level voltage) is sensed and an average dark level voltage VCMA is generated. This common-mode voltage, or a derivative, is subtracted from the illuminated pixel voltages when OBP is inactive (high) to generate the corrected pixel value. VCMA will be equal to the common-mode voltage (VCM) when the dark level voltage is zero. The output of the OBC cancellation circuit, OBC_OUT, pulses between VCM and VCMA, with the pulse height (VCMA-VCM) being equal to the average black-level offset.

Figure 4:
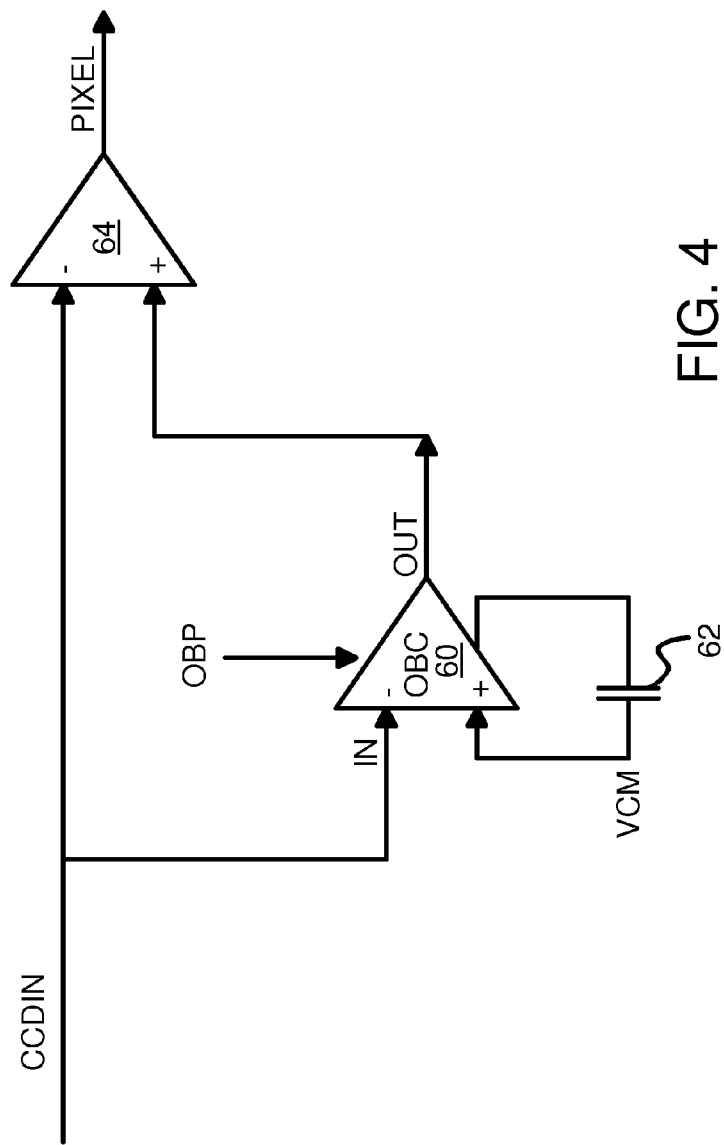
FIG. 4 is a diagram of an Optical Black Pixel (OBP) cancellation circuit connected to a subtracting buffer.
Figure 5:
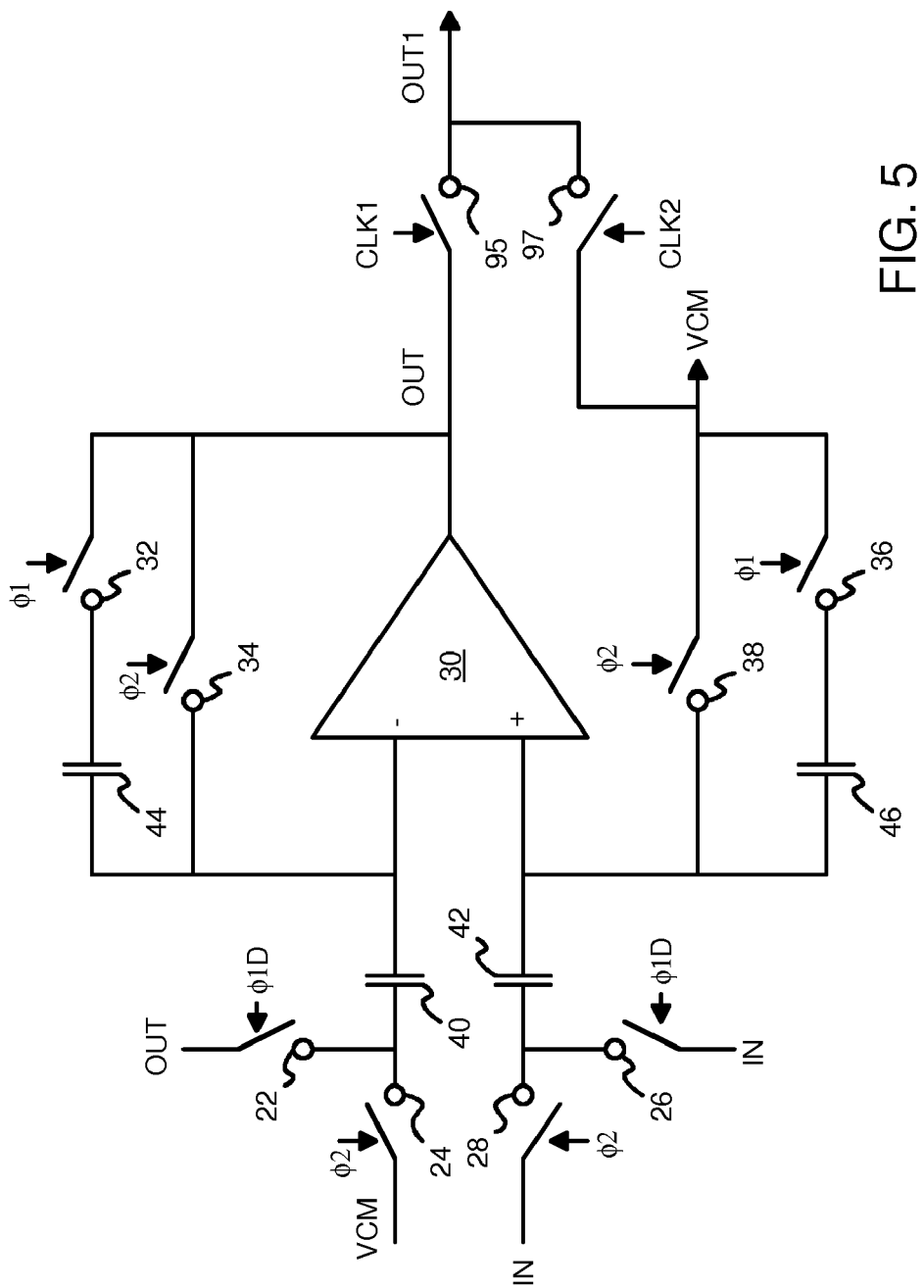
FIG. 5 is a schematic of a closed-loop Optical Black-Level Sampling and Averaging circuit.

FIG. 4 is a diagram of an Optical Black Pixel (OBP) cancellation circuit connected to a subtracting buffer. The input of the Analog Front End (AFE) is single-ended in this example. CCD/CMOS sensor 10 (FIG. 1) outputs pixel voltages on line CCDIN which is the input signal IN to Optical Black Pixel Cancellation (OBC) circuit 60. OBC circuit 60 is activated when signal OBP is active (low) when dark pixel sensors 14 are read out of CCD/CMOS sensor 10. During this time IN (dark level offset) is sampled and averaged by OBC circuit 60. The output of OBC circuit 60 is a pulse train that swings between VCMA and VCM where the difference between VCMA and VCM is the average value of the dark level offset. The details of OBC circuit 60 are shown in FIG. 5. Charge is stored on capacitor 62.

The output of OBC circuit 60, OUT, is applied to the non-inverting input of subtracting buffer 64, while CCDIN is applied to the other input of subtracting buffer 64. Thus, the output of subtracting buffer 64 is equal to the difference between CCDIN and the output of OBC circuit 60.

Since the pixel values are negative voltages on CCDIN, applying CCDIN to the inverting (−) input and applying the output of OBC circuit 60 to the non-inverting (+) input of subtracting buffer 64 effectively inverts the low-going pixels to generate positive pixel values. However, this signal inversion can also be done at a later stage (either CDS or PGA) of the AFE just before the ADC.

FIG. 5 is a schematic of a closed-loop Optical Black-Level Sampling and Averaging circuit. The circuit of FIG. 5 performs the functions of OBC circuit 60 and capacitor 62 of FIG. 4. The circuit of FIG. 5 generates a pulse train that switches between VCMA and VCM. The difference between VCMA and VCM is the average dark level offset. It is later subtracted from illuminated pixels.

Amplifier 30 is a differential input amplifier such as an op amp. When feedback switches 34, 38 close during φ2, the output OUT is connected to the inverting input (−) and common-mode voltage VCM is connected to the non-inverting input (+). Amplifier 30 operates in unity gain feedback and sets the common-mode output voltage of amplifier 30 to be VCM when the amplifier offset is assumed to be zero. Any amplifier offset is zeroed out and stored in capacitor 40 at this phase. During φ1 feedback capacitor switches 32, 36 close to connect the back plate of feedback capacitor 44 to OUT and the back plate of accumulating capacitor 46 to VCM.

The common-mode voltage VCM can be generated by an external or internal reference-voltage generator such as a bandgap reference circuit. For example, VCM can be 1.5 volts in one embodiment, or can have other values for other embodiments.

The front plate of sampling capacitor 40 is connected to VCM by sampling switch 24 during φ2 and to output OUT by sampling switch 22 during φ1D, which is similar to φ1 when OBP is active (low). The front plate of sampling capacitor 42 is connected to IN by sampling switch 28 during φ2 and by sampling switch 26 during φ1D.

Output switch 95 closes when CLK1 is active, connecting the output OUT of amplifier 30 to output OUT1. Output switch 97 closes when CLK2 is active, connecting VCM to output OUT1. Output switches 95, 97 provide the proper timing of the output signal OUT for the next stage in the pixel data pipeline. A pulse train is created on OUT1 that pulses between VCM and VCMA.

Figure 6:
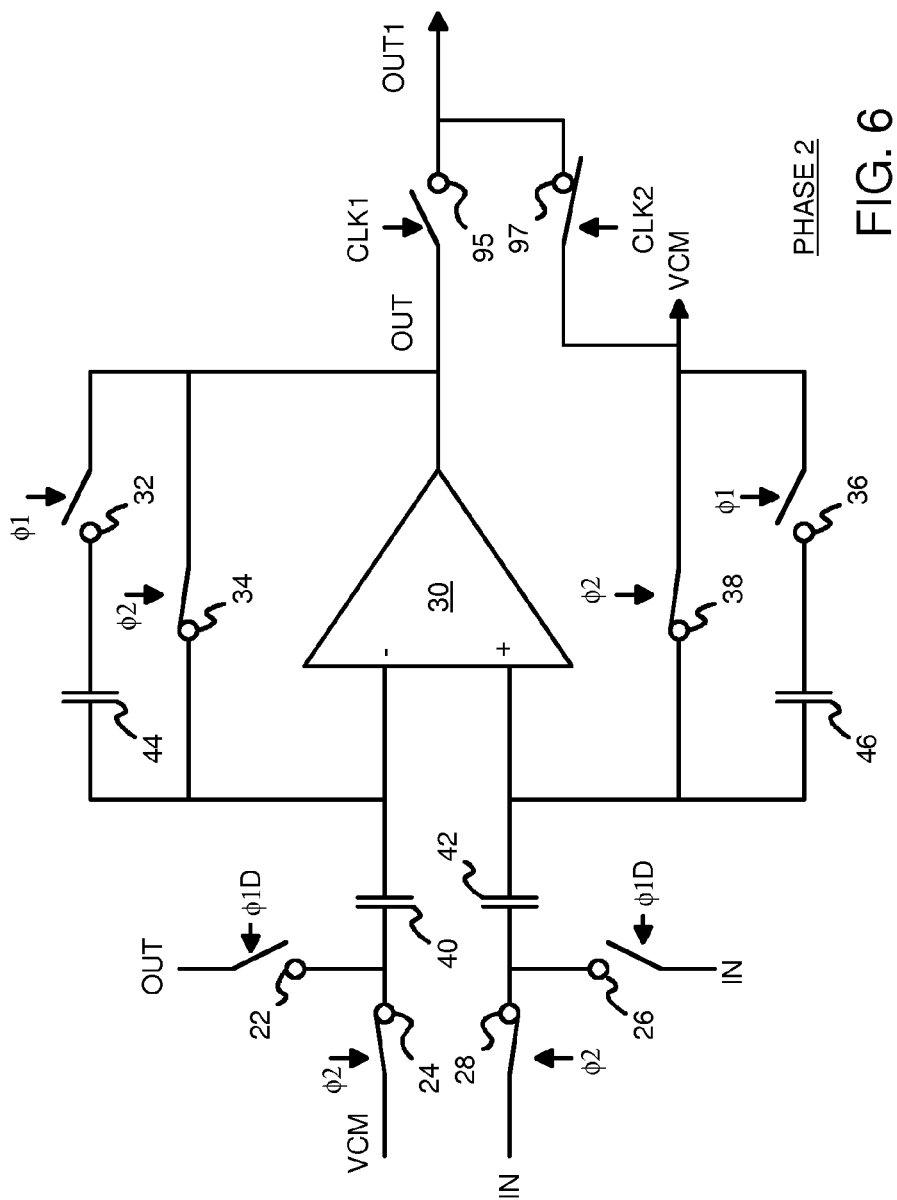
FIG. 6 highlights operation of the OBP cancellation circuit of FIG. 5 in phase 2.

FIG. 6 highlights operation of the OBP cancellation circuit of FIG. 5 during phase 2. Phase 2 is active when clock $\phi2$ is high and clock $\phi1$ and derivative clock $\phi1D$ are low. Also, CLK2 is high and CLK1 is low during phase 2. Switches 22, 26, 32, 36, 95 are open during phase 2.

During phase 2, sampling switch 28 connects input IN to one end of sampling capacitor 42 and feedback switch 38 connects common-mode voltage VCM to another end of sampling capacitor 42 so that the pixel input IN is sampled by storing charge on sampling capacitor 42. Common-mode voltage VCM is connected to sampling capacitor 40 by sampling switch 24 and charge is stored on sampling capacitor 40, depending on the node voltage at the inverting input (−). Since output OUT is connected to the inverting input (−) of amplifier 30 by feedback switch 34 and the non-inverting input (+) of amplifier 30 is connected to VCM by feedback switch 38, amplifier 30 is in unity-gain configuration. The inverting input (−) of amplifier 30 is equal to the sum of VCM and the offset of amplifier 30.

Thus the input pixel voltage is stored on sampling capacitor 42 and the amplifier offset is stored on sampling capacitor 40 during phase 2 when $\phi2$ is active. Amplifier 30 is zeroed out. Output switch 95 is open and output switch 97 is closed during phase 2, connecting VCM to output OUT1.

Figure 7:
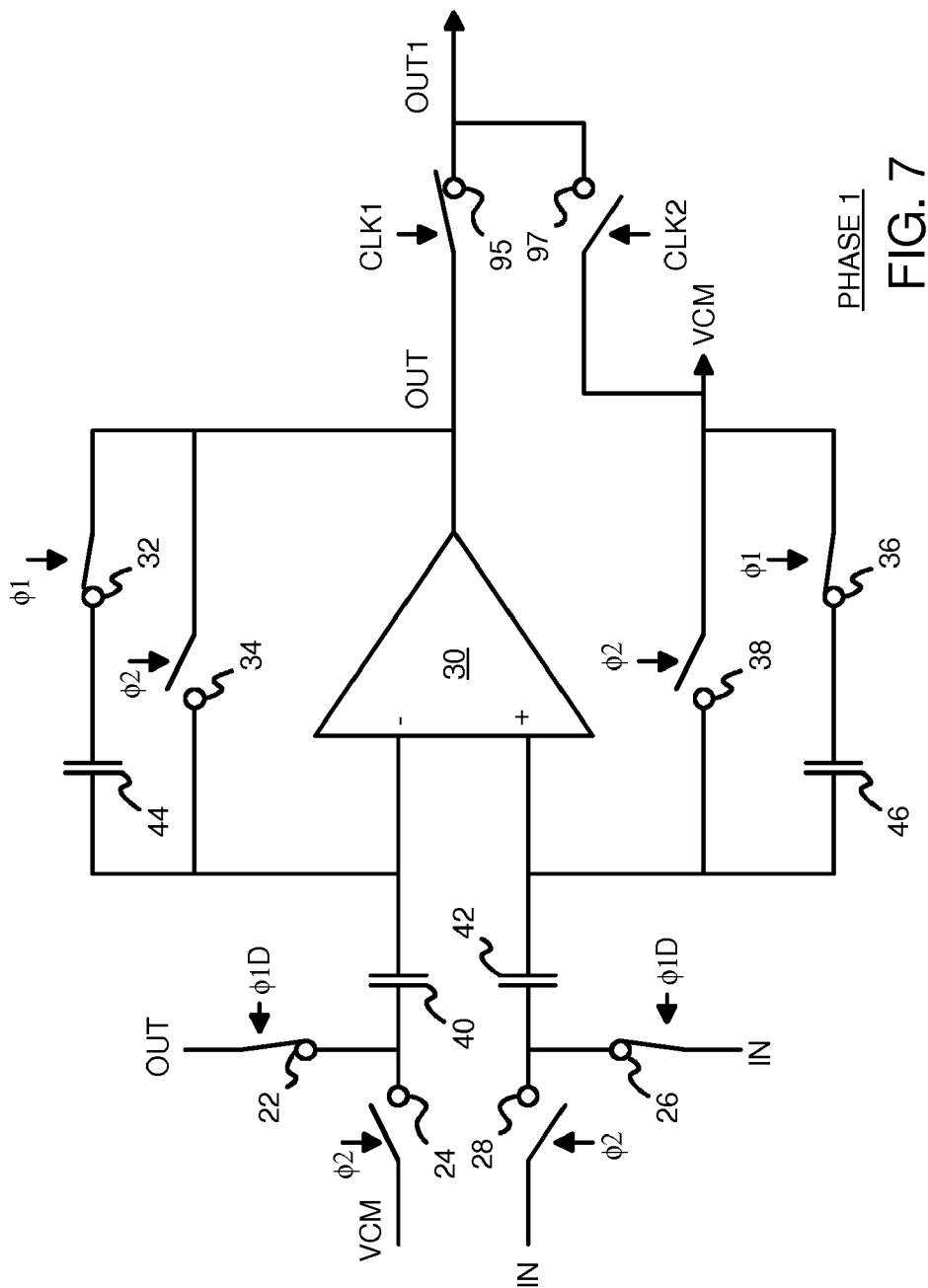
FIG. 7 highlights operation of the OBP cancellation circuit of FIG. 5 in phase 1.

FIG. 7 highlights operation of the OBP cancellation circuit of FIG. 5 during phase 1. Phase 1 is active when clock $\phi1$ and derivative clock $\phi1D$ are high and $\phi2$ is low. CLK1 is high and CLK2 is low during phase 1. Switches 22, 26, 32, 36, 95 are closed during phase 2 and switches 24, 28, 34, 38, 97 are open.

As can be seen in the waveform of FIG. 3, each CCDIN pulse has a higher fixed-voltage part that is the same voltage for all pixels, and a variable low-voltage part that has a variable low-going voltage. The magnitude of the variable low-going voltage part of a CCDIN pulse encodes the pixel value. Two clocks are used to sample both the fixed and the variable part of each CCDIN pulse. CLK1 samples the fixed part and CLK2 samples the variable-voltage part of a CCDIN pulse.

Since $\phi1$ occurs when CLK1 is active and $\phi2$ occurs when CLK2 is active (when OBP is active-low), the fixed-voltage part of the CCDIN pulse is sampled during $\phi1$, while the variable-voltage part of the CCDIN pulse is sampled during $\phi2$. The pixel value is encoded by CCD/CMOS sensor 10 as the negative voltage pulse that occurs during $\phi2$, while a fixed voltage is output by CCD/CMOS sensor 10 during $\phi1$.

During phase 1, sampling switch 26 connects input IN to sampling capacitor 42 so that the pixel input IN is sampled by storing charge on sampling capacitor 42. This is the fixed-voltage part of the CCDIN pulse that is being sampled by switch 26. The variable-voltage part of the CCDIN switch was sampled by switch 28 during phase 2.

Thus sampling capacitor 42 stores the difference between the variable-voltage sampled portion and the fixed-voltage sampled portion of each CCDIN pulse. This voltage difference for the current CCDIN pulse is pushed from sampling capacitor 42 to accumulating capacitor 46 by charge sharing during phase 1. When switch 38 opens, the back plate of accumulating capacitor 46 is connected to VCM by switch 36. Accumulating capacitor 46 accumulates the newly-sampled difference in the current CCDIN pulse with that of prior CCDIN pulse. Therefore accumulating capacitor 46 accumulates the dark-level voltage of CCDIN pulses and drives the non-inverting input (+) of amplifier 30 during phase 1.

The output OUT of amplifier 30 is connected to the front plate of sampling capacitor 40 by sampling switch 22. Output OUT of amplifier 30 is also applied to the back plate of feedback capacitor 44 by switch 32. Feedback capacitor 44 holds the average value of the offset of amplifier 30, while capacitor 46 holds the average voltage of the dark pixels. The inverting input to amplifier 30 is driven close to the non-inverting input due to the feedback action of amplifier 30. During phase 1, the output of amplifier 30 will be equal to the dark level offset plus the amplifier output common mode VCM. Any amplifier offset is cancelled out by the averaged amplifier offset stored in capacitor 44.

VCM is a reference voltage generated by an internal voltage reference circuit such as a bandgap reference circuit (not shown). VCMA is VCM+$\Delta$, where $\Delta$ is the average dark pixel offset. After averaging, the output of amplifier 30 becomes the sum of VCM and the average dark level voltage (VCMA).

Sampling capacitor 42 and accumulating capacitor 46 and their associated switches form a discrete-time first-order low-pass filter that filters the input voltage. Amplifier 30 acts as a unity-gain buffer to provide averaged dark voltage VCMA when OBP is inactive.

Then the accumulated average dark voltage VCMA appears during phase 1 and also when OBP is inactive. Amplifier 30 is a unity-gain buffer and does not provide any amplification on the sampled offset. Output switch 95 closes and output switch 97 is open in phase 1, connecting the output of amplifier 30 to output OUT1. A pulse train is created on OUT1 that pulses between VCM and VCMA.

Figure 2:
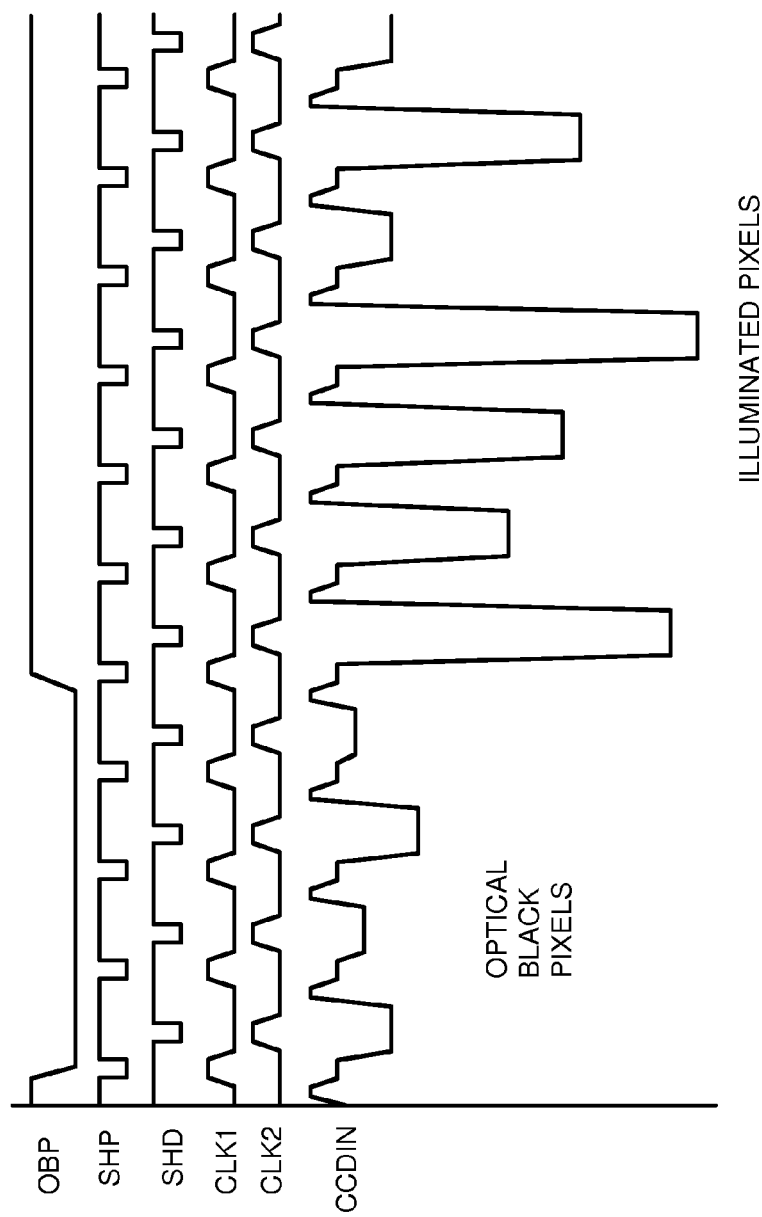
FIG. 2 is a waveform diagram of operation of the CCD/CMOS sensor.
Figure 8:
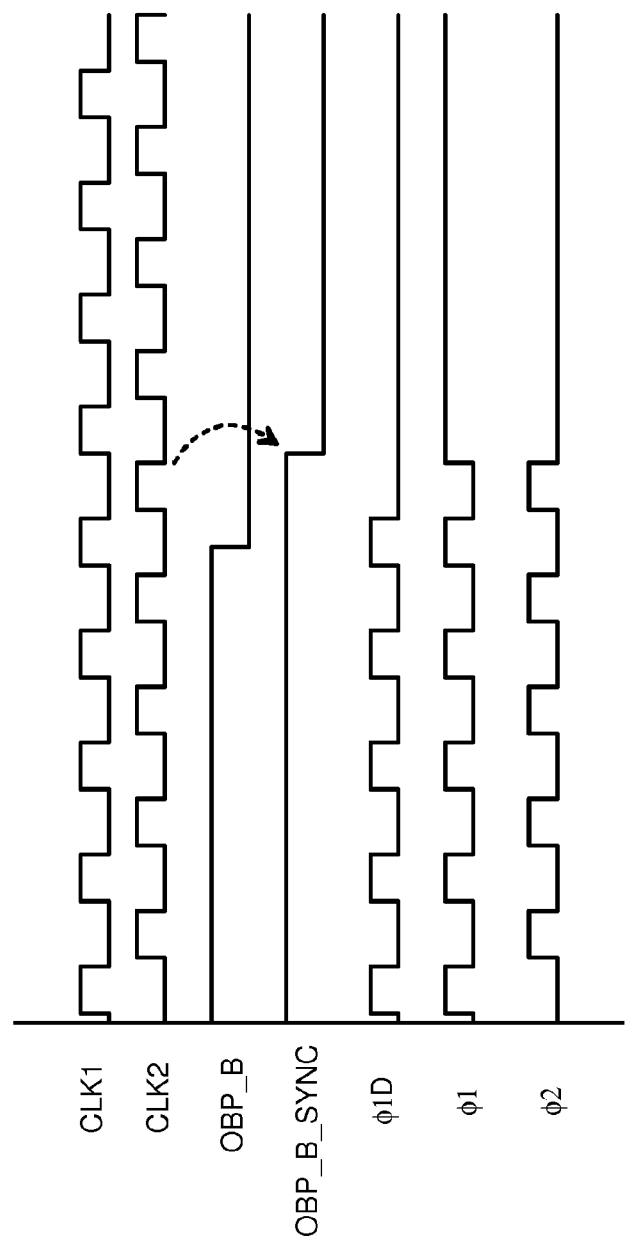
FIG. 8 is a timing diagram of control signals to the OBP cancellation circuit of FIGS. 5-7.

FIG. 8 is a timing diagram of control signals to the OBP cancellation circuit of FIGS. 5-7. CLK1 and CLK2 are generated from SHP and SHD such that CLK1 and CLK2 will not be active (high) at the same time to CCD/CMOS sensor 10 as shown in FIG. 2. A low-going voltage on CCDIN is sampled at the CLK2 falling edge while the fixed reference voltage of CCDIN is sampled at the CLK1 falling edge.

When dark pixel sensors 14 are being scanned out of CCD/CMOS sensor 10 at the ends of a horizontal line of pixels, signal OBP is active low and signal OBP_B is active high. Clock $\phi1$ is generated from CLK1 and clock $\phi2$ is generated from CLK2 as shown. Clock $\phi1D$ is the same as clock $\phi1$ when OBP_B is active high. When OBP is active, OBP_B is active high and clock $\phi1$ is held high while clock $\phi1D$ is held at low.

When the first illuminated pixel sensor 12 in the horizontal line of pixels is ready to be scanned out of CCD/CMOS sensor 10, signal OBP_B goes inactive (low). Signal OBP_B is synchronized to the falling edge of CLK2 by a flip-flop to generate OBP_B_SYNC with a synchronization delay.

Signal OBP_B_SYNC is used to gate the clocks $\phi1$, $\phi2$. This gating stops $\phi1$, $\phi1D$, and $\phi2$ at the right timing to hold the dark level voltage for the AFE. The AFE cancels the dark level voltage from the CCDIN illuminated pixels. When OBP_B_SYNC is inactive, $\phi1$ remains high and $\phi2$ remains low, so the OBP cancellation circuit remains in the phase 1 state. However, $\phi1D$ is also driven low, so that switches 22, 26 remain open. Since sampling switches 24, 28 are also open, the front plates of sampling capacitors 40, 42 remain floating when OBP is inactive. This isolation of sampling capacitors 40, 42 preserves their charges while illuminated pixels are shifted out of CCD/CMOS sensor 10.

During this illuminated-pixel phase-1 state, no further sampling of CCDIN occurs. The average dark level voltage is held at the output of amplifier 30.

Figure 9:
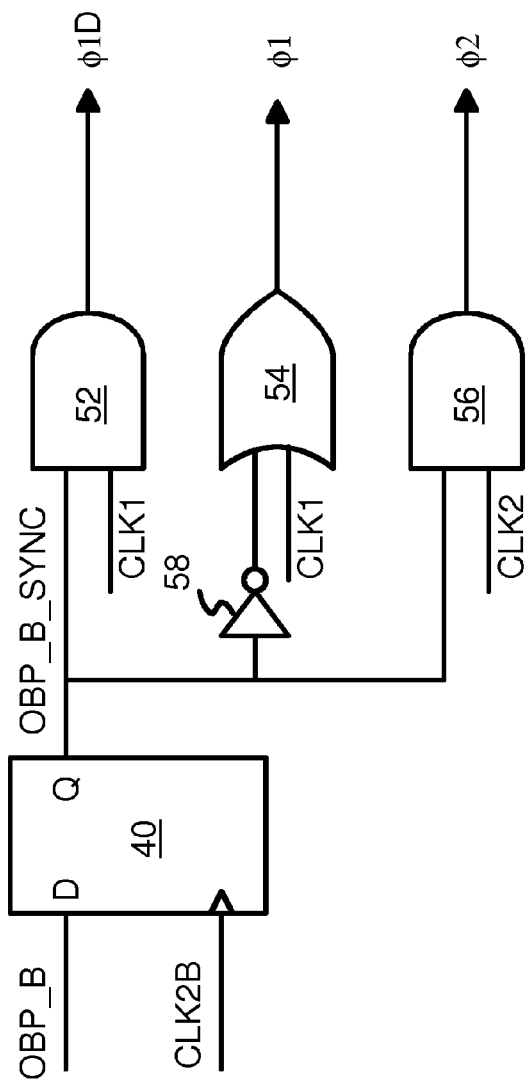
FIG. 9 is a block diagram of a timing generator for an OBP cancellation circuit.

FIG. 9 is a block diagram of a timing generator for an OBP cancellation circuit. The timing generator of FIG. 9 can generate the waveform of FIG. 8 for clocks φ1, φ2, and φ1D of FIGS. 5-7.

D-type flip-flop 40 receives CLK2B to sample signal OBP_B on the falling edge of CLK2. Flip-flop 40 outputs OBP_B_SYNC synchronized to the inverse of CLK2, CLK2B. OR gate 54 passes CLK1 to φ1 when OBP_B_ SYNC is high, but drives a high to φ1 when OBP_B_SYNC is low and inverted by inverter 58, causing the OBP cancellation circuit to remain in the phase 1 state when OBP is inactive. AND gate 56 passes CLK2 to φ2 when OBP_B_ SYNC is low, but drives a high to φ1 when OBP_B_SYNC is high, causing the OBP cancellation circuit to remain in the phase 1 state when OBP is inactive.

FIGS. 10A-C show three locations of the OBP cancellation circuit in a digital image-capture device. In FIG. 10A, CCD/CMOS sensor 10 (FIG. 1) generates analog signal CCDIN as shown in FIG. 2, which is applied to the IN input of OBP cancellation circuit 50. This is also the IN input of FIGS. 5-7. Differences in voltages of CCDIN are accumulated to generate the average common-mode voltage VCMA, which is subtracted from the CCDIN signal or its derivatives. The black-level-corrected output from OBP cancellation circuit 50 can then be applied to correlated double sampling (CDS) circuit 102, which generates a signal to programmable gain amplifier (PGA) 104. If the CDS has a single-ended input, the circuit in FIG. 4 can be used. Otherwise, the difference amplifier (subtracting buffer 64) can be omitted if the input of CDS circuit 102 is fully differential.

PGA 104 has a gain that is programmable to provide white-level balance, saturation, or exposure control or other features. The analog output of PGA 104 is applied to Analog-to-Digital Converter (ADC) 106, which generates a digital output, ADC_OUT. This digital output can be encoded in various formats such as Joint-Picture-Experts Group (JPEG) or Motion-Picture-Experts Group (MPEG), and transmitted, stored, or displayed.

FIG. 10B shows the OBP cancellation circuit 50 placed after correlated double sampling (CDS) circuit 102 and before PGA 104. CCDIN can be applied to CDS circuit 102 and then the analog output from CDS circuit 102 applied as the IN input to OBP cancellation circuit 50. Then the offset voltage due to CDS circuit 102 and the dark level voltage of the CCD/CMOS sensor VCMA is generated and subtracted to generate a black-level-corrected output, which is input to PGA 104.

FIG. 10C shows OBP cancellation circuit 50 placed after PGA 104 but before ADC 106. CCDIN is applied to CDS circuit 102 which drives the input to PGA 104. The analog output from PGA 104 is applied as the IN input to OBP cancellation circuit 50. Then the offsets due to the CCD/CMOS sensor dark level voltage, CDS circuit 102, and PGA 104 is generated and subtracted to generate a black-level-corrected output, which is input to ADC 106. CDS circuit 102 samples the CCDIN input twice for each pulse; once at the fixed voltage portion of the pulse, and a second time for the variable-voltage pixel-value portion of the CCDIN pulse.

OBP cancellation circuit 50 can be placed in all three locations, depending on the accuracy requirements for the remaining offset that can be tolerated at the output of AFE. FIGS. 10A-C are just examples of locations that OBP cancellation circuit 50 can be placed and the invention is limited only to those particular examples.

Figure 11:
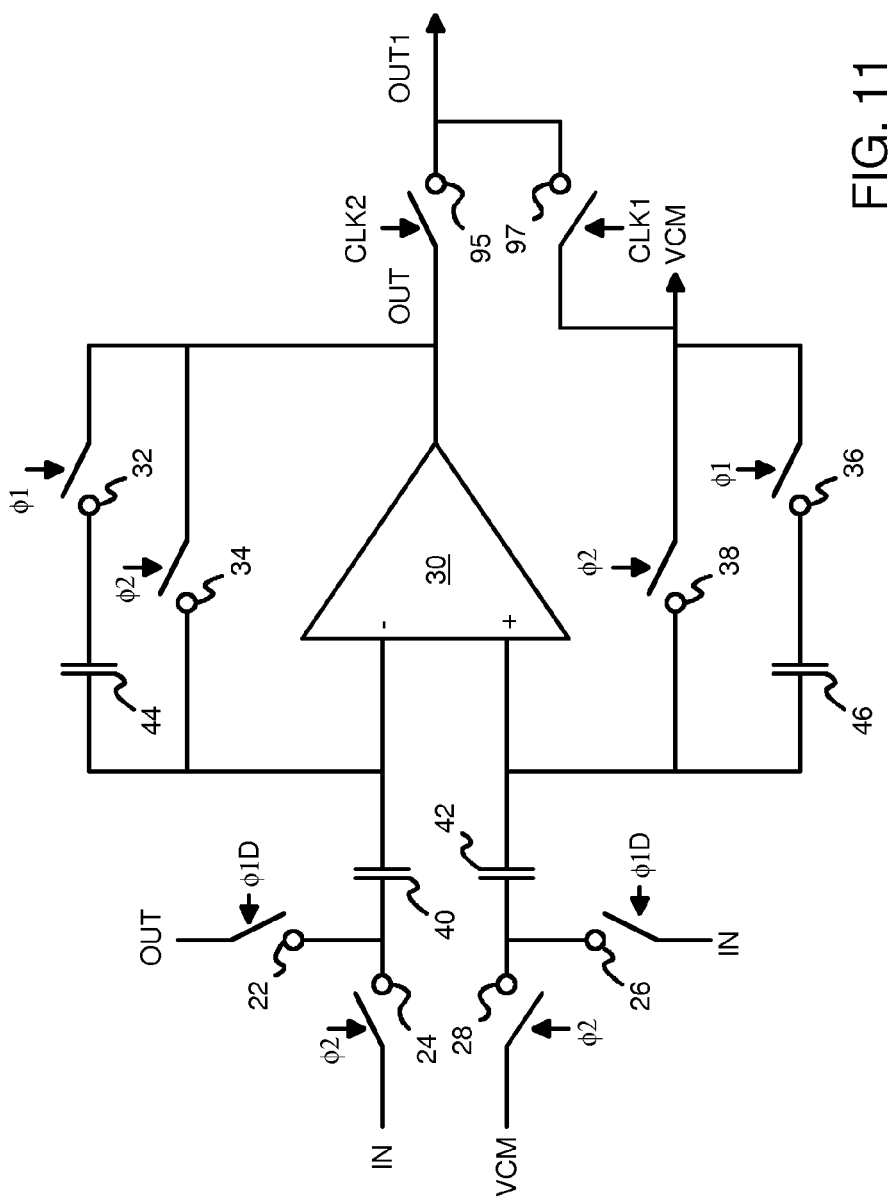
FIG. 11 is an alternate embodiment of the OBP cancellation circuit.

FIG. 11 is an alternate embodiment of the OBP cancellation circuit. The OBP cancellation circuit is similar to that of FIG. 5, except that inputs IN and VCM have been swapped to sampling switches 24, 28. The voltage difference within each CCDIN pulse is sampled by sampling capacitor 40 while VCM is fed to sampling capacitor 42. The inputs to the next stage, such as correlated double sampling (CDS) circuit 102, can be swapped to compensate for the swapping of inputs IN and VCM to sampling switches 24, 28. Output switch 95 closes when CLK2 is active, connecting the output of amplifier 30 to output OUT1. Output switch 97 closes when CLK1 is active, connecting VCM to output OUT1. A pulse train is created on OUT1 that pulses between VCM and VCMA.

Alternate Embodiments

Several other embodiments are contemplated by the inventors. For example fully differential signals may be used or single-ended signals may be used at various points in the data path. The difference between OUT and VCM is the average dark level voltage detected by OBC circuit 60. Other slight variations may also be present, even when idealized equations or first-order analysis indicates equality of voltages or other parameters. Various parasitics may be present in real circuits.

Rather than use positive-logic gates, inverting gates may be used. DeMorgan's theorem may be used to alter logic as desired. Additional components such as buffers, inverters, latches, registers, capacitors, resistors, etc. may be added at various nodes for various reasons, such as for power-saving or reset modes. Dark pixel cancellation can be done either at the beginning of the line or at the end of the line or only once every few lines.

Multiple OBP cancellation circuits 50 could be used at several places in the datastream. For example, a first OBP cancellation circuit 50 could be placed before CDS circuit 102 as shown in FIG. 10A, and a second OBP cancellation circuit 50 could be placed after PGA 104 as shown in FIG. 10C.

Inversions may be added by swapping inverting and non-inverting inputs as desired, but do not change the overall function and thus may be considered equivalents. Capacitors and other filter elements may be added. Switches could be n-channel transistors, p-channel transistors, or transmission gates with parallel n-channel and p-channel transistors.

Additional components may be added at various nodes, such as resistors, capacitors, inductors, transistors, etc., and parasitic components may also be present. Enabling and disabling the circuit could be accomplished with additional transistors or in other ways. Pass-gate transistors or transmission gates could be added for isolation.

Inversions may be added, or extra buffering. The final sizes of transistors and capacitors may be selected after circuit simulation or field testing. Metal-mask options or other programmable components may be used to select the final capacitor, resistor, or transistor sizes.

While comparison to a single analog voltage has been described, a differential analog voltage could also be compared. Differential analog voltages could also be compared using a differential amplifier with a defined gain at the input. While an operational amplifier (op amp) has been described, other kinds of comparators could be used, such as non-amplifying compare buffers.

While positive currents have been described, currents may be negative or positive, as electrons or holes may be considered the carrier in some cases. Source and sink currents may be interchangeable terms when referring to carriers of opposite polarity. Currents may flow in the reverse direction.

The circuit designer may choose resistors, capacitors, transistors, and other components to have a ratio that produces the desired reference voltages. While Complementary-Metal-Oxide-Semiconductor (CMOS) transistors have been described, other transistor technologies and variations may be substituted, and materials other than silicon may be used, such as Galium-Arsinide (GaAs) and other variations. Various CCD/CMOS sensor and array technologies may be used for CCD/CMOS sensor 10, and arrays may have various arrangements and sizes.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An Optical Black Pixel (OBP) cancellation circuit comprising:
   a pixel input receiving a pixel pulse from an image sensor;
   an output indicating an average black-level signal;
   a differential amplifier having a first differential input and a second differential input and generating the output from a voltage difference between the first differential input and the second differential input;
   a feedback switch coupled between the output and the first differential input;
   a feedback capacitor coupled to the first differential input and a first feedback node;
   a series feedback switch coupled between the first feedback node and the output;
   an accumulating switch coupled between a reference node carrying a reference voltage and the second differential input;
   an accumulating capacitor coupled to the second differential input and a second accumulating node;
   a series accumulating switch coupled between the second accumulating node and the reference node;
   a first sampling capacitor coupled between the first differential input and a first sample node;
   a first secondary sampling switch coupled between a first sample input and the first sample node for connecting the first sample input and the first sample node during a secondary phase;
   a first primary sampling switch coupled between the output and the first sample node for connecting the output and the first sample node during a primary phase;
   a second sampling capacitor coupled between the second differential input and a second sample node;
   a second secondary sampling switch coupled between a second sample input and the second sample node for connecting the second sample input and the second sample node during the secondary phase; and
   a second primary sampling switch coupled between the pixel input and the second sample node for connecting the pixel input and the second sample node during the primary phase;
   wherein the pixel input is coupled to one of the first sample input and the second sample input;
   wherein the reference voltage is coupled to another one of the first sample input and the second sample input that is not connected to the pixel input.

2. The Optical Black Pixel (OBP) cancellation circuit of claim 1 wherein the feedback switch is closed during the secondary phase and isolates during the primary phase;
   wherein the series feedback switch is closed during the primary phase and isolates during the secondary phase;
   wherein the accumulating switch is closed during the secondary phase and isolates during the primary phase;
   wherein the series accumulating switch is closed during the primary phase and isolates during the secondary phase.

3. The Optical Black Pixel (OBP) cancellation circuit of claim 2 further comprising:
   an OBP input that receives an OBP signal that is active when dark pixels are being shifted out of the image sensor, the dark pixels being covered from receiving illumination;
   wherein the primary phase remains active and the secondary phase remains inactive when the OBP signal is not active;
   wherein the primary phase and the secondary phase are alternately active when the OBP signal is active.

4. The Optical Black Pixel (OBP) cancellation circuit of claim 3 further comprising:
   a first clock indicating the primary phase;
   a second clock indicating the secondary phase;
   wherein the primary phase and the secondary phase are non-overlapping phases.

5. The Optical Black Pixel (OBP) cancellation circuit of claim 4 wherein the first clock is applied to the series feedback switch and the series accumulating switch;
   wherein the second clock is applied to the feedback switch, the accumulating switch, the first secondary sampling switch, and the second secondary sampling switch.

6. The Optical Black Pixel (OBP) cancellation circuit of claim 5 further comprising:
   a derivative first clock that remains inactive when the OBP signal is not active, and follows the first clock when the OBP signal is active;
   wherein the first primary sampling switch and the second primary sampling switch receive the derivative first clock.

7. The Optical Black Pixel (OBP) cancellation circuit of claim 5 further comprising:
a clock generator that generates the first clock and the second clock from a first shift clock applied to the image sensor and from a second shift clock applied to the image sensor for shifting out pixels from the image sensor.

8. The Optical Black Pixel (OBP) cancellation circuit of claim 7 wherein the clock generator further comprises:
a synchronizer that receives the OBP signal and generates a synchronized OBP signal;
a first gate that passes the first clock when the synchronized OBP signal is active and blocks the first clock when the synchronized OBP signal is not active;
a second gate that passes the second clock when the synchronized OBP signal is active and blocks the second clock when the synchronized OBP signal is not active,
whereby the first clock and the second clock are blocked from pulsing when the synchronized OBP signal is not active.

9. The Optical Black Pixel (OBP) cancellation circuit of claim 7 further comprising:
an OBP input that receives an OBP signal that is active when dark pixels are being shifted out of the image sensor, the dark pixels being covered from receiving illumination;
a subtractor, receiving the pixel input, and receiving the output, for subtracting the average black-level signal on the output from the pixel input to generate a black-level-corrected pixel output,
whereby illuminated pixels are corrected for black level by subtracting the average black-level signal generated on the output of the differential amplifier when the OBP signal is active.

10. The Optical Black Pixel (OBP) cancellation circuit of claim 9 further comprising:
a first output switch, receiving the first clock, for connecting the average black-level signal on the output to an input of the subtractor during the primary phase;
a second output switch, receiving the second clock, for connecting the reference voltage on the reference node to the input of the subtractor during the secondary phase.

11. The Optical Black Pixel (OBP) cancellation circuit of claim 4 wherein the pixel pulse comprises a low-going variable-voltage portion of the pixel pulse wherein a low-going voltage encodes an intensity of a pixel from the image sensor, and a fixed-voltage portion of the pixel pulse that does not encode the intensity of the pixel from the image sensor,
whereby pixel pulses have variable and fixed voltage portions.

12. The Optical Black Pixel (OBP) cancellation circuit of claim 11 wherein the fixed-voltage portion of the pixel pulse is sampled by the first clock;
wherein the low-going variable-voltage portion of the pixel pulse is sampled by the second clock.

13. The Optical Black Pixel (OBP) cancellation circuit of claim 5 wherein the pixel input is coupled to the first sample input and the reference voltage is coupled to the second sample input.

14. The Optical Black Pixel (OBP) cancellation circuit of claim 5 wherein the pixel input is coupled to the second sample input and the reference voltage is coupled to the first sample input.

15. The Optical Black Pixel (OBP) cancellation circuit of claim 5 further comprising:
a correlated double sampling (CDS) circuit, coupled between the image sensor and the pixel input.

16. The Optical Black Pixel (OBP) cancellation circuit of claim 5 further comprising:
a programmable gain amplifier (PGA) coupled between a PGA input and the pixel input;
a correlated double sampling (CDS) circuit, coupled between the image sensor and the PGA input.

17. A black-level corrector comprising:
a pixel input having pixel pulses representing pixels from an image sensor;
a first clock that is active when the pixel input is at a portion of a pixel pulse with fixed value that does not vary with pixel intensity from the image sensor;
a second clock that is active when the pixel input is at a portion of the pixel pulse with a variable value that varies with pixel intensity from the image sensor;
an op amp having a first amp input and a second amp input and an output;
a first sampling switch connecting a common-mode voltage to a first sample node when the second clock is active;
a first alternate sampling switch connecting the output to the first sample node when the first clock is active;
a first sampling capacitor coupled between the first sample node and the first amp input;
a first feedback switch connecting the output to the first amp input when the second clock is active;
a feedback capacitor coupled between the first amp input and a first feedback node;
a first series feedback switch connecting the first feedback node to the output when the first clock is active;
a second sampling switch connecting the pixel input to a second sample node when the second clock is active;
a second alternate sampling switch connecting the pixel input to the second sample node when the first clock is active;
a second sampling capacitor coupled between the second sample node and the second amp input;
a second feedback switch connecting the common-mode voltage to the second amp input when the second clock is active;
an accumulating capacitor coupled between the second amp input and a second feedback node; and
a second series feedback switch connecting the second feedback node to the common-mode voltage when the first clock is active.

18. The black-level corrector of claim 17 further comprising:
a first output switch for connecting the output to a pulsing node, wherein the pulsing node carries an averaged black-pixel voltage when the first clock is active;
a second output switch for connecting the common-mode voltage to the pulsing node, wherein the pulsing node carries the common-mode voltage when the second clock is active;
wherein the pulsing node pulses between the averaged black-pixel voltage and the common-mode voltage;
a subtractor receiving the pixel input and receiving the pulsing node, for generating a difference of the pixel input and the averaged black-pixel voltage to generate a black-level-corrected pixel output,
whereby black-level correction is performed.

19. An optical-pixel black-level corrector comprising:
pixel input means for receiving pixel pulses representing pixels from an image sensor;
first clock means for indicating when a pixel pulse received by the pixel input means is at a fixed value that does not vary with pixel intensity from the image sensor;

wherein the first clock means is active during the fixed value of the pixel pulse;
second clock means for indicating when the pixel pulse received by the pixel input means is at a variable value that varies with pixel intensity from the image sensor;
wherein the second clock means is active during the variable value of the pixel pulse;
amplifier means, having a first amp input and a second amp input, for generating an output as a function of a voltage difference between the first amp input and the second amp input;
first sampling switch means for connecting a common-mode voltage to a first sample node when the second clock means is active;
first alternate sampling switch means for connecting the output to the first sample node when the first clock means is active;
first sampling capacitor means for storing charge between the first sample node and the first amp input;
first feedback switch means for connecting the output to the first amp input when the second clock means is active;
feedback capacitor means for storing charge between the first amp input and a first feedback node;
first series feedback switch means for connecting the first feedback node to the output when the first clock means is active;
second sampling switch means for connecting the pixel input means to a second sample node when the second clock means is active;
second alternate sampling switch means for connecting the pixel input means to the second sample node when the first clock means is active;
second sampling capacitor means for storing charge between the second sample node and the second amp input;
second feedback switch means for connecting the common-mode voltage to the second amp input when the second clock means is active;
accumulating capacitor means for storing charge between the second amp input and a second feedback node; and
second series feedback switch means for connecting the second feedback node to the common-mode voltage when the first clock means is active.

20. The optical-pixel black-level corrector of claim 19 further comprising:
a first output switch means for connecting the output to a pulsing node, wherein the pulsing node carries an averaged black-pixel signal when the first clock means is active;
a second output switch means for connecting the common-mode voltage to the pulsing node, wherein the pulsing node carries the common-mode voltage when the second clock means is active;
wherein the pulsing node pulses between the averaged black-pixel signal and the common-mode voltage;
difference means, receiving the pixel input means and receiving the averaged black-pixel signal, for generating a difference of the pixel input means and the averaged black-pixel signal to generate a black-level-corrected pixel output,
whereby black-level correction is performed.

* * * * *